United States Patent
Wadhwani et al.

(10) Patent No.: US 11,551,541 B2
(45) Date of Patent: Jan. 10, 2023

(54) CONFIGURING DEVICES IN CONTROL SYSTEMS

(71) Applicant: CARRIER CORPORATION, Palm Beach Gardens, FL (US)

(72) Inventors: Sangeeta Wadhwani, Telangana (IN); Sreeramya Soratkal, Telangana (IN); Sowmya Paturu, Telangana (IN)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 17/254,693

(22) PCT Filed: May 20, 2020

(86) PCT No.: PCT/IB2020/054781
§ 371 (c)(1),
(2) Date: Dec. 21, 2020

(87) PCT Pub. No.: WO2020/245686
PCT Pub. Date: Dec. 10, 2020

(65) Prior Publication Data
US 2022/0084390 A1    Mar. 17, 2022

(30) Foreign Application Priority Data
Jun. 3, 2019 (IN) .............................. 201911022031

(51) Int. Cl.
*G08B 25/00* (2006.01)
*H04W 4/33* (2018.01)
*H04W 4/029* (2018.01)

(52) U.S. Cl.
CPC .......... *G08B 25/003* (2013.01); *H04W 4/029* (2018.02); *H04W 4/33* (2018.02)

(58) Field of Classification Search
CPC .... G08B 25/003; G08B 25/009; G08B 25/08; G08B 25/10; G08B 29/126; G08B 29/14;
(Continued)

(56) References Cited

U.S. PATENT DOCUMENTS

| 8,400,317 B2 | 3/2013 | Johnson, Jr. et al. |
| 9,262,913 B2 | 2/2016 | Yamada et al. |

(Continued)

FOREIGN PATENT DOCUMENTS

| AU | 2016231491 A1 | 4/2018 |
| CN | 201667109 U | 12/2010 |

(Continued)

OTHER PUBLICATIONS

International Search Report for international Application No. PCT/IB2020/054781; Application Filing Date: May 20, 2020; dated Aug. 31, 2020; 3 pages.

(Continued)

*Primary Examiner* — Hirdepal Singh
(74) *Attorney, Agent, or Firm* — Cantor Colburn LLP (57) ABSTRACT

Aspects of the invention are directed towards method system and devices assisting the configuration, installation and maintenance of the devices in a system. The invention describes integrating a digitized map on a user terminal. The digitized map comprises positions for configuring one or more devices. The user terminal receives position co-ordinates and configuration information of each of the one or more devices. The user terminal requests configuration for one or more devices and receives the configuration based on the configuration information. The received configuration is transmitted to the one or more thereby configuring the one or more devices.

20 Claims, 4 Drawing Sheets

(58) Field of Classification Search
CPC ....... G08B 29/145; G08B 25/14; H04W 4/33; H04W 4/029
USPC ...................................................... 455/456.1
See application file for complete search history.

(56) References Cited

U.S. PATENT DOCUMENTS

| | | |
|---|---|---|
| 9,830,806 B2 | 11/2017 | Cree et al. |
| 9,990,841 B2 | 6/2018 | Moffa |
| 10,074,265 B2 | 9/2018 | Moffa |
| 2015/0142898 A1* | 5/2015 | Piccolo, III ............ G08B 17/00 709/204 |
| 2016/0148498 A1* | 5/2016 | Ruszala ............... G08B 25/003 340/506 |
| 2016/0225251 A1* | 8/2016 | Di Marco .............. G08B 29/12 |
| 2017/0091998 A1 | 3/2017 | Piccolo, III |
| 2018/0200552 A1 | 7/2018 | Wertsberger |
| 2018/0317095 A1 | 11/2018 | Rumler et al. |
| 2019/0362618 A1* | 11/2019 | Rao ..................... G06F 3/04817 |

FOREIGN PATENT DOCUMENTS

| | | |
|---|---|---|
| CN | 102542719 A | 7/2012 |
| CN | 202422376 U | 9/2012 |
| CN | 202584338 U | 12/2012 |
| CN | 106228736 A | 12/2016 |
| CN | 107644502 A | 1/2018 |
| CN | 109523760 A | 3/2019 |
| WO | 2015107449 A1 | 7/2015 |

OTHER PUBLICATIONS

Written Opinion for International Application No. PCT/IB2020/054781; Application Filing Date: May 20, 2020; dated Aug. 31, 2020; 6 pages.

* cited by examiner

CONFIGURING DEVICES IN CONTROL SYSTEMS

CROSS-REFERENCE TO RELATED APPLICATIONS

This application is a National Stage Application of PCT/IB2020/054781, filed May 20, 2020, which claims priority to India Application No. 201911022031 filed on Jun. 3, 2019, both of which are incorporated herein by reference in their entirety.

TECHNICAL FIELD OF INVENTION

The present invention relates generally to a safety device configuration and installation. More particularly, the invention relates to an apparatus and method for installation of devices in fire alarm systems.

BACKGROUND OF THE INVENTION

Fire alarm system involves installation and commissioning of sensors, detectors, control panels, and other devices. The process of installation and commissioning the devices involves a cumbersome process. A technician is provided with a floor plan. The technician visits the area and identifies the devices based on the floor plan. The devices are scanned (e.g. for QR code) to identify each device for configuration. The details of the devices are fed in a worksheet that is validated for correct entries for each of the devices in the entire area. The process further involves multiple checks on a configuration utility software to ensure the devices are configured and installed as per the floorplan making the entire process to be manually intensive. The configuration utility (CU) device is generally secluded on a site.

In a conventional device loop wiring arrangement a fire control panel supports up to 250 addressable devices (for example) on a loop and a typical building comprises around 10 such loops (for example). Thus, in this example a technician needs to scan around 2500 devices in an area for receiving the details of all the devices. These details are then required to be fed in a worksheet. The worksheet is further validated using the utility software. This process is prone to human errors while the data is fed in the worksheet. Further, it is also a labor intensive task to scan each of the 2500 devices and also marking the location information for each device.

Further, there are instances where a device malfunctions and the technician needs to visit the area and determine the fault with the device. If configuration of the device is faulty, the technician may need to scan the details and bring an appropriate configuration update for the device by visiting the area again.

The above instances and examples clearly indicate the manual intensive and time consuming nature of the installation in the fire alarm systems.

Therefore, there is a need in the art to develop methods and systems for configuring and installing the devices in an area with minimum manual effort and in minimum duration.

SUMMARY OF THE INVENTION

Various embodiments of the invention describe a method for configuring one or more devices efficiently and to reduce manual intensive tasks for installation. The method describes integrating a digitized map on a user terminal. The digitized map comprises positions for configuring one or more devices in an area. The user navigates the area and places one or more devices at their respective positions. After placing the devices, position co-ordinates and configuration information of each of the one or more devices are received by the user terminal. Based on the configuration information, the user terminal requests a configuration for one or more devices from a server. Thereafter, the user terminal receives a configuration for the one or more devices. The received configuration is transmitted to each of the placed one or more devices thereby configuring the one or more devices.

In another embodiment of the invention the configuration information is scanned from the one or more devices which include serial number, model number, device type for one or more devices.

In an embodiment of the invention, the integration of the digitized map, navigation of the one or more devices, receiving of the position co-ordinates and the configuration information, and the receiving of the configuration for each device are associated with a user application on the user terminal.

In yet another embodiment of the invention a user can navigate to the one or more devices by using the position co-ordinates of the one or more devices based on an indoor positioning system.

In another embodiment of the invention the one or more devices are detectors, modules, appliances, annunciators, and hooters In still another embodiment of the invention the one or more devices can be wireless devices and the position co-ordinates for each wireless device are determined by the user terminal using strength of wireless signals received from the wireless devices.

In another embodiment of the invention the one or more devices are connected to a control panel, wherein the user terminal is configured to transmit a request to the server for transmitting the configuration of the one or more devices to the control panel.

In still another embodiment of the invention the control panel transmits the configuration for the one or more devices received from the server to one or more devices.

In another embodiment of the invention the user terminal is configured to detect a wrongly configured device and update correct configuration for the wrongly configured device.

In yet another embodiment of the invention the configuration of each of the one or more devices can be modified by a user of the user terminal.

In another embodiment of the invention a user terminal is disclosed for efficiently configuring one or more devices in an area. The user terminal comprises an integration module adapted to integrate a digitized map on a user terminal. The digitized map comprises positions for configuring one or more devices and a user navigates the one or more devices by using the positions of the one or more devices on the digitized map. A receiver of the user terminal is adapted to receive position co-ordinates and configuration information of each of the one or more devices. Based on the configuration information, the receiver of the user terminal requests for configuration and further receives the configuration for the one or more devices on the user terminal. A transmitter of the user terminal transmits the configuration to each of the one or more devices. Thus, the one or more devices are configured for further operation.

In another embodiment of the invention the configuration information is scanned from the one or more devices which include serial number, model number, device type for one or more devices.

In yet another embodiment of the invention, the request comprises at least the configuration information of the one or more devices.

In another embodiment of the invention the integration of the digitized map, navigation of the one or more devices, receiving of the position co-ordinates and the configuration information, and the receiving of the configuration for each device are associated with a user application on the user terminal.

In still another embodiment of the invention, the one or more devices are detectors, modules, appliances, annunciators, and hooters.

In an embodiment of the invention the one or more devices are wireless devices and the position co-ordinates for each of the wireless device are determined by the user terminal using strength of wireless signals received from the wireless devices.

In another embodiment of the invention, the transmitter is further adapted to transmit the configuration of the one or more devices to the control panel.

In yet another embodiment of the invention the control panel transmits the configuration for the one or more devices received from the server to the one or more devices.

In still another embodiment of the invention the configuration of each of the one or more devices can be modified by a user of the user terminal.

In another embodiment of the invention a system comprising a control panel, a cloud or server, and a user terminal is disclosed. The user terminal is configured to assist configuration of one or more devices by configuring a digitized map on the user terminal, the digitized map comprising positions for placing one or more devices. The one or more devices are placed according to the positions on the digitized map by navigating the one or more devices using an indoor positioning system. The position co-ordinates of the placed one or more devices are received by the user terminal along with configuration information of each device. Based on the configuration information, the user terminal is configured to receive configuration for each of the one or more devices based on a request. The received configuration is transmitted to each of the one or more devices. The one or more devices are thus configured for operation.

In various other embodiments of the invention a computer readable medium is disclosed comprising one or more processors and a memory coupled to the one or more processors. The memory stores instructions which are executed by the one or more processors to integrate a digitized map on the user terminal. The digitized map comprises positions for configuring one or more devices. The processor is configured to navigate the one or more devices by using the positions of the one or more devices on the digitized map. The processor is further configured to receive position co-ordinates and configuration information for each of the one or more devices on the user terminal, the position co-ordinates and the configuration information are received after placing the one or more devices based on the digitized map and receive a configuration for the one or more devices based on a request, the request including configuration information of the one or more devices. The processor is configured to transmit the configuration to each of the placed one or more devices thereby installing the one or more devices.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Described herein is the technology with systems, methods, and devices for configuring one or more devices in buildings, large premises, airports, shopping malls, museums and the like. In different embodiments of the invention one or more devices are configured conveniently using a handheld device such as a user terminal. The technology described herein directs a user such as a technician to navigate entire area of a building etc. for configuring and commissioning the one or more devices. The use of the user terminal reduces the labor intensive process of installation as well as defects on any of the devices can be handled remotely. The user terminal is also suitable to provide configuration update for the devices from any remote location.

Various embodiments of the invention describe configuring a digitized map on a user terminal. The digitized map represents the entire area along with positions of devices to be installed in the area. The digitized map may be associated with a user application on the user terminal. The devices are placed at an appropriate locations according to the digitized map. The user may navigate the area for placing the devices by using an indoor positioning system or other navigation modules associated with the user terminal. The user terminal then receives position co-ordinates and configuration information for each of the one or more devices. The position co-ordinates of each of the device can be received by using strength of the wireless signals originating from the device in case the device is a wireless device (say using Wi-Fi). Alternatively, the device position can be determined using the indoor positioning system. After determining the configuration information, a configuration for the device is received on the user terminal from a cloud or a server. The received configuration is then transmitted to the device based on the configuration information thereby configuring the one or more devices.

The configuration information available on the device can be scanned and retrieved on the user terminal. The user terminal can use one or more components such as camera module, a bar code reader or the like to scan the configuration information from the device. At the same time, the user terminal can record position co-ordinates of the device. A device identifier, configuration information, and the position co-ordinates are recorded together on the user terminal, for example, on a user application of the user terminal. However, other information may also be recorded which is within the scope of this invention. The user terminal is configured to receive configuration for the device based on the configuration information. The user terminal may initiate a request to receive configuration based on the configuration information. The request may be transmitted to storage location such as a cloud, server etc. to retrieve the appropriate configuration for the device. The configuration thus received from the cloud is transmitted to configure an appropriate device. Accordingly, the device would be available for use after completing the configuration process using the user terminal.

It is understood that the above disclosure related to one device is exemplary and applies to large number of devices being installed according to the digitized map of a floor plan. In case of large number of devices, the user terminal may receive the configuration information along with the position co-ordinates for each of the devices. Further, the user terminal is also configured to receive configurations pertaining to each of the devices placed in the area. Each device can be enabled for operation by configuring the received configuration to respective devices. If the devices have wireless communication capabilities, the configuration can be transmitted either wirelessly directly to each of the devices. On the other hand, if the devices do not have wireless communication capabilities or if the wireless capabilities of the devices are turned off, the configuration for each device may be sent to a control panel. The control panel may further initiate transmission of the configuration to appropriate devices and thereby installing the configuration to each device. Accordingly, the devices thus configured would be ready to use for intended function.

In an embodiment of the invention, the configuration information received or scanned from the device can be serial number, model number, device type of the one or more devices and other aspects of the configuration required to uniquely obtain the configuration for the devices. Based on the configuration information, the user terminal may fetch the appropriate configuration for the device which may be subsequently used to configure the device for operation. The configuration may be fetched from the cloud or server. In another embodiment, it may be automatically received by the user terminal.

After receiving the configuration for one or more devices from the cloud, the user or the technician may modify the configuration based on the requirement. This enables an accurate configuration of the one or more devices as required. In another embodiment of the invention, by using the user terminal a technician may detect a wrongly configured device and accordingly update the appropriate configuration on the wrongly configured device.

In an embodiment of the invention, the position co-ordinates of the devices may be determined by the user terminal. The position co-ordinates may be determined by an indoor positioning system associated with the user terminal. The user terminal may include any of a gyroscope, an accelerometer, Ultra-Wideband (UWB) chips, near field communication, magnetic field detection chips to determining position co-ordinates of each of the devices. The position co-ordinates can also be determined using Bluetooth beacons, Wi-Fi signals, Near Field communication among others by determining strength of the signals. It is understood that the above technologies used to determine the position co-ordinates can be embedded inside the user terminal or may be coupled with the user terminal.

The one or more devices described herein can be different types of devices for fire control such as smoke detectors, heat detectors, any gas detectors but not limited thereto. The devices can also be modules, appliances, annunciators, and hooters but not limited thereto. The one or more devices are coupled with a control panel. The control panel is capable of issuing controlling actions based on the type of detection obtained from the one or more devices (e.g. detectors). The one or more devices on sensing any specific signals according to their operation may transmit a report indicating the result of sensing. The control panel may take appropriate action based on the report by the one or more devices.

Figure 1:
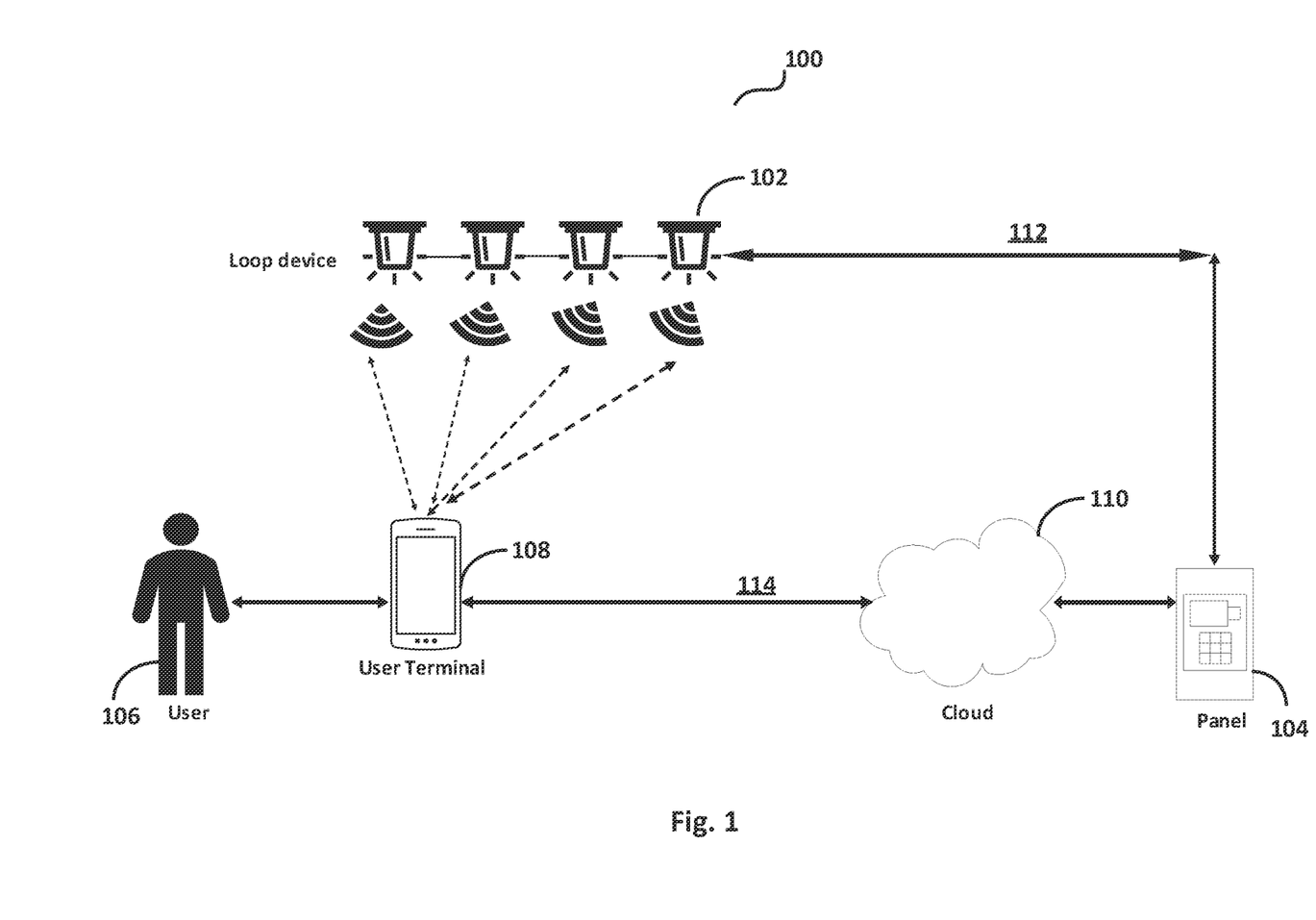
FIG. 1 is an exemplary diagram illustrating a system in accordance with an embodiment of the invention.

Turning now to figures, FIG. 1 depicts a system (100) for configuring devices in large buildings and premises according to one embodiment of the invention. A panel (104) is coupled with one or more devices (102). The devices are capable of interacting with a user terminal (108). A user (106), for example, a technician with the help of the user terminal (108) can configure and install the devices (102). The user terminal (108) is also connected to a cloud (110) for receiving the configuration of each of the devices. The cloud can be a server or a remote storage location for storing the configuration of the one or more devices. As discussed above, the panel provides control functions in an area where the devices are configured. The cloud is capable of storing the configuration of the devices which can be fetched by the user terminal based on a requirement. The user terminal can also direct or request the cloud to send the configuration to the panel directly. On receiving such a configuration, the panel can itself configure the devices using communication link (112). If the devices have the wireless communication capabilities, the devices can be configured by the user terminal.

The user terminal can be any hand held device such as a smartphone or a tablet and the like with at least a display, a storage unit and network connectivity. As an example, the hand held device may be an Apple® tablet or smartphone, an Android® tablet or smartphone, a Windows® tablet or smartphone and/or the like. According to an embodiment of the invention, the user terminal is able to configure a digitized map and receive and transmit position coordinates and configuration information of each of the devices to be installed. In general, an operating system is available on the user terminal that provides an interface for the user or the technician to communicate with the devices and the control panel. In an example, the operating system installed on the hand held device or the user terminal is an Android® based operating system, a Window® based operating system, and an Apple® based operating system or any other operating system known in the art. Further, the user terminal can use one or more components such as camera module, a bar code reader or the like to scan the configuration information from the device.

Figure 2:
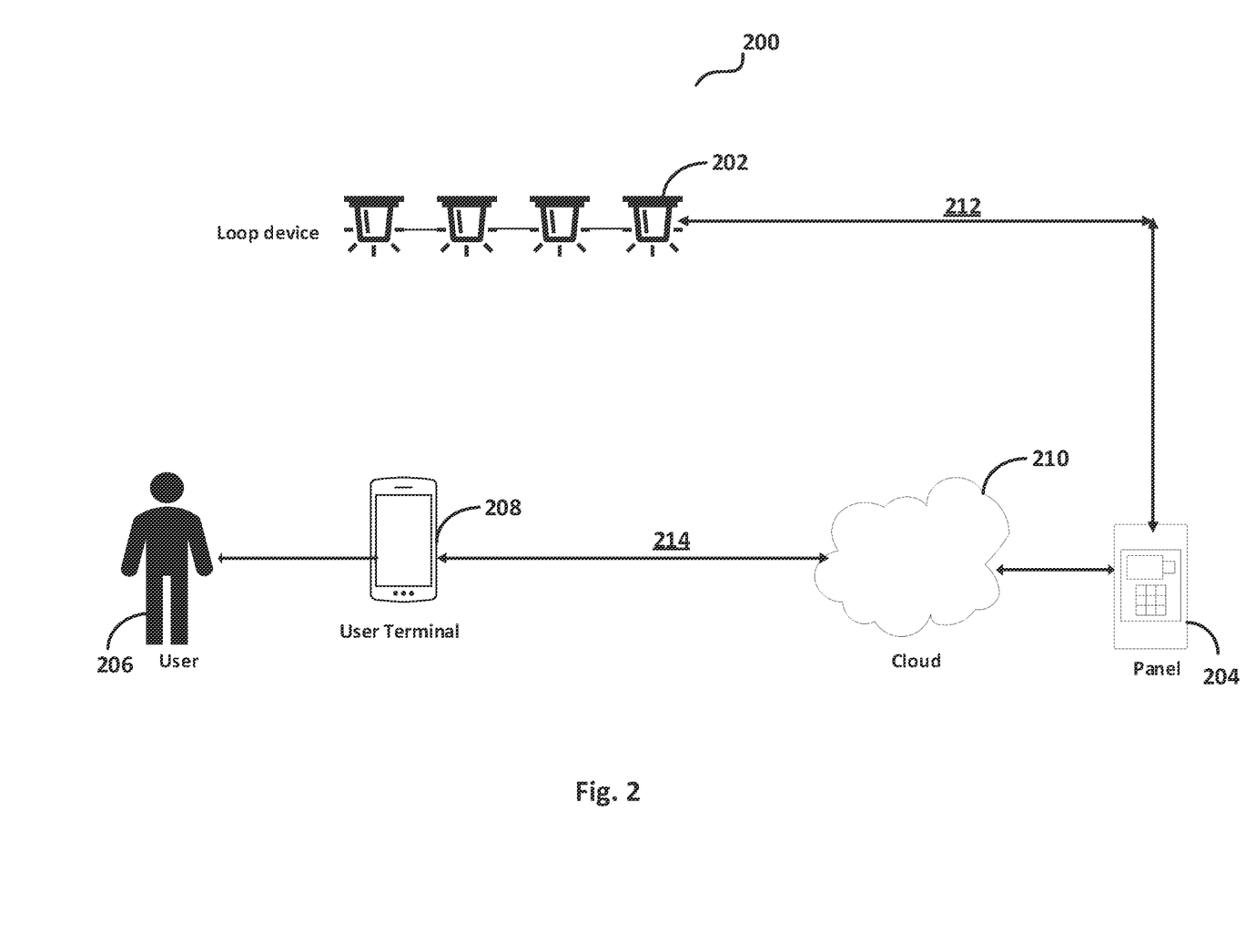
FIG. 2 is an exemplary diagram illustrating a system in accordance with another embodiment of the invention.

FIG. 2 depicts a system (200) for configuration of devices according to one embodiment of the invention. A panel (204) may be connected to one or more devices (202). In this case unlike FIG. 1, the devices do not have wireless communication capabilities. The panel (204) therefore, communicates with the user terminal (208) through a cloud (210). The user terminal may identify configuration information of each of the devices by scanning configuration information from the device for example, a barcode and the like. The user terminal based on the configuration information may request the cloud (210) to transmit the configuration for the device to the panel (204). The panel may further transmit the received configuration to the appropriate device. It may be noted that panel can be an addressable and can address each of the devices through communication paths. All the devices (202) are connected to the panel (204) and their position is determined using indoor positioning system by the user terminal.

Figure 3:
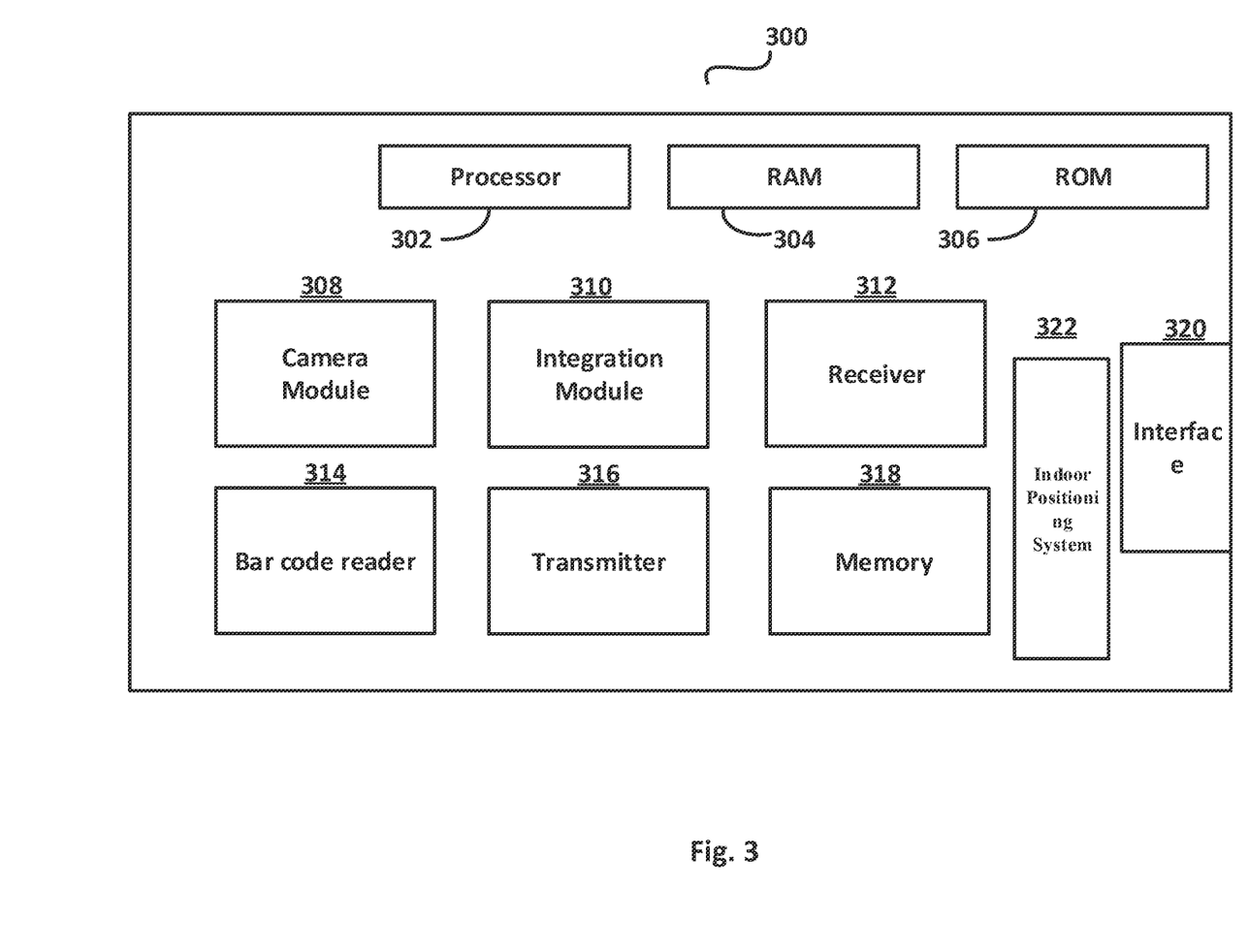
FIG. 3 is an exemplary block diagram showing different components of a user terminal according to an embodiment of the invention.

FIG. 3 depicts the different components of a user terminal (300) having same functionalities as the user terminal 108 and 208 described in FIG. 1 and FIG. 2. The user terminal (300) comprises a processor (302), a Random Access Memory (RAM) (304), a Read Only Memory (ROM) (306) and a storage memory (318) which work together to achieve the different functions that are performed by the user terminal (300). Additionally, the user terminal (300) comprises an interface (320) for interacting with the outside world. For example, the interface can be used to communicate with the cloud. Moreover, the interface can be used to communicate with the devices. Further, the interface may include different modules for different types of wired and wireless communications within the capacity of the user terminal. An integration module (310) integrates the digitized map on the user terminal. The digitized map may be configured to be associated with a particular user application. The user application on the user terminal is intended for the purpose of configuring and installing the devices. The user may navigate the one or more devices using an indoor positioning system (322) integrated with the user application. The receiver (312) receives the location co-ordinates and configuration information of each of the devices as discussed above. The integration module (310) configures the position co-ordinates of each of the devices and the transmitter (316) transmits the configuration information to an intended destination. The transmitter transmits the configuration to the interface, from where the configuration is communicated to the devices.

The user terminal (300) also includes a camera module (308) and a scanner or bar code reader (314) or the like to scan the configuration information of the devices. The interface may use a Wi-Fi communication to transmit the configuration to the devices. The interface (320) of the user terminal (300) may also transmit signals requesting the cloud to send the configuration for associated device to the panel. In this case, the signals may include identifier associated with a device to be configured along with the configuration information scanned by the user terminal.

Figure 4:
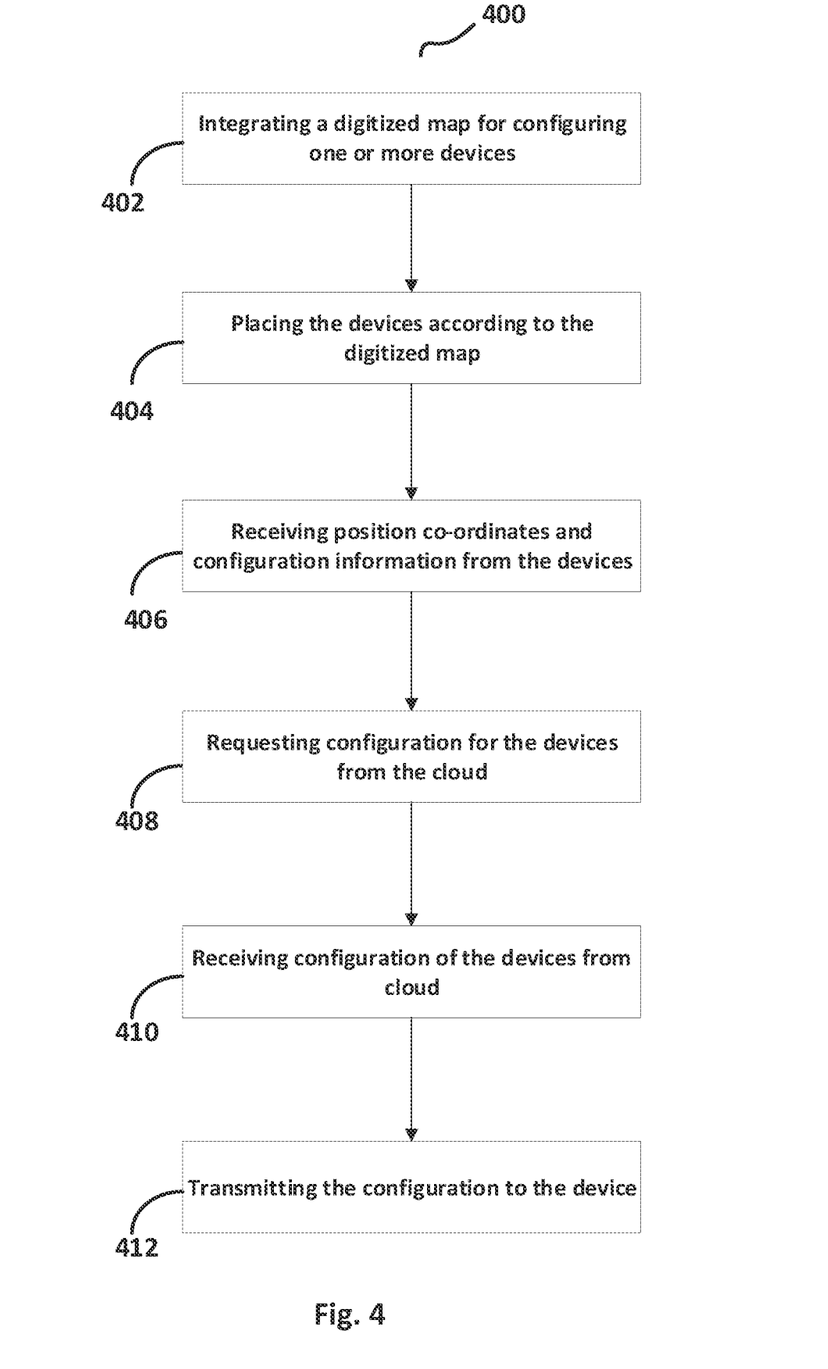
FIG. 4 is an exemplary flowchart illustrating a method to perform the invention according to an embodiment of the invention.

FIG. 4 depicts a flowchart outlining the features of the invention in an embodiment of the invention. The flowchart (400) describes a method being performed for enabling the invention. The method starts at (402) with integration of a digitized map on the user terminal for configuring one or more devices. The digitized map may be configured by associating the map with user application. Once the digitized map is configured, the devices are placed according to the digitized map (404). The user of the user terminal may navigate to place the devices by using an indoor positioning system. After that, the user terminal receives position coordinates of the devices (406). At the same time, the user terminal also scans configuration information of the devices. The position co-ordinates and the configuration information are stored on the user terminal and are associated with the user application. Based on the configuration information, the user terminal requests cloud to send configuration for the devices. The user terminal may transmit a request comprising the configuration information. On the other hand, the user terminal may transmit the request by sending identifiers associated with the configuration information (408). In an embodiment the request may include unique identifiers for each devices. On receiving the request, the cloud sends the configuration for the devices to the user terminal (410). The configuration received by the user terminal is then transmitted to each of the placed devices (412) enabling their installation.

In an embodiment of the invention, the user terminal may request the cloud to send the configuration for the devices to a control panel as discussed above. In such a case, the request from the user terminal may include identifiers indicating the required configuration and the designated address (e.g. control panel).

In another embodiment of the invention, if the devices are already installed and if there is any malfunctioning of the devices due to the configuration of the devices, the technician may initiate a configuration update based on the requirement from a remote location. In an embodiment, the technician simply use the configuration details of the device already stored on the user application to update the configuration.

Embodiments of the invention can be exemplified without limiting the scope of the invention. For example, the installation of devices can be part of a fire control system. The fire control system includes a panel to control one or more devices in a building. For installing the devices associated with the control panel, a technician may visit the building with a floor plan which may be digitized and configured on the user terminal carried by the technician. The technician may place the devices (e.g. loop devices) according to the digitized map. The technician may further scan each device placed by him. By scanning each device, configuration information required to configure the device is received on the user terminal. The technician at the same time may receive the position co-ordinates of the device using an indoor positioning system. Similarly, the technician may receive the position co-ordinates and the configuration information for all the devices. The technician may then request the configuration for each device using the user terminal. The request is transmitted to a cloud server. In response to the request, the configuration may be received from the cloud server on the user terminal.

The user terminal may receive the configuration for each of the devices and then the technician may initiate installation of the devices with the received configuration. Alternatively, the technician may receive one configuration at one time and subsequently install the configuration to each device. Thereafter, the technician may repeat this process for each device. On the other hand, the technician may send the configuration information for all the devices along with the identifiers to the cloud. The cloud may further send the configuration for all the devices to the control panel. The control panel may then provide configuration for all the devices. Similarly, user terminal may request sending configuration from the cloud to the control panel for one device at a time, In other words, a first device may be configured first before starting process to configure a second device.

In another embodiment of the invention, after receiving the configuration information on the user terminal, the technician may initiate a request including the identifiers as discussed above along with an instruction regarding the destination address for receiving the configuration. The technician may request the configuration for the devices to be transmitted to a control panel.

Embodiments of the invention describe a user terminal comprising an integration module for integrating a digitized map on a user terminal. The digitized map comprises positions for configuring one or more devices. The user terminal comprises a receiver to receive position co-ordinates and configuration information of each of the one or more device. The position co-ordinates and the configuration information are received after placing the one or more devices based on the digitized map. The receiver of the user device is further adapted to receive a configuration for the one or more devices on the user terminal. The configuration for each of the devices is received after the user terminal sends a request to obtain the configuration for the devices. In another embodiment, the request on the user terminal can be initiated automatically once the configuration information and the position co-ordinates are received by the user application on the user terminal. The request for the configuration of the devices is sent to a storage location such as a cloud. The configuring of the digitized map, receiving of the position co-ordinates and the configuration information with the receipt of the configuration for each device are associated with a user application on the user terminal. That is, the user application on the user terminal can be an account with all the details of the one or more devices integrated at a single location. A transmitter of the user terminal transmits the configuration to each of the placed one or more devices based on the configuration information thereby installing the one or more devices. A user of the user terminal can use the user application to edit or modify the configuration information before transmitting the configuration to the devices for installation.

It may be noted that the user can use different types of buttons, gestures, and other input means known in the art can be used to interact with the user application.

In an embodiment of the invention, the user application on the user terminal may request for the configuration of the devices by sending instructions to the cloud. The instructions may include sending the configuration of the devices to a panel which is connected with the devices. As discussed above the request may include unique identifiers for identifying the configuration for each of the devices.

In another embodiments of the invention a system is disclosed which includes a control panel for controlling the one or more devices. The system includes a cloud to communicate with the control panel and a user terminal. The user terminal assists in configuration of the one or more devices. The user device is integrated with a digitized map and the digitized map comprises positions for placing the one or more devices. The user terminal further receives position co-ordinates and configuration information for each of the one or more devices on the user terminal. The position co-ordinates and the configuration information are received after placing the one or more devices based on the digitized map. The user terminal may send a request to the cloud for receiving configuration for the one or more devices. The received configuration from the cloud is transmitted to each of the placed one or more devices based on the configuration information for configuring the one or more devices.

Another embodiment of the invention discloses a computer readable medium comprising one or more processors and a memory coupled to the one or more processors, the memory storing instructions which are executed by the one or more processors, the one or more processors are operable to configure a digitized map on a user terminal. The digitized map comprises positions for configuring one or more devices. Position co-ordinates and configuration information for each of the one or more devices are received on the user terminal after the one or more devices are placed according to the positions on the digitized map. The one or more processors are operable to request configuration for one or more devices based on the configuration information. In response to the request the processors receive configuration for the one or more devices. The received configuration can be transmitted to each of the placed one or more devices for configuring the one or more devices.

The one or more processors may be operable to request the configuration for the one or more devices based on the configuration information with instructions to transmit the configuration to a control panel. The control panel may transmit the configuration to each of the one or more devices for configuration.

The invention provides various advantages of seamlessly install the devices in a system by reducing the labor intensive work and saving significantly on time. The invention described herein can be used to remotely update the configuration of devices. Thus, by using the invention, one may be able to efficiently utilize the resources and cuts on the time and efforts of the technician.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

Further reference to any content has been made throughout the specification and words and phrases such as "user device", "user terminal", "mobile terminal", "mobile phone", or the like have been interchangeably used and means the handheld device for installing the configuration for all the devices in the system. Moreover, the words and phrases like "cloud", "server", "cloud server" or the like have been interchangeably used which means a storage location located remotely for storing configuration and configuration updates for all the devices in the system. Further words and phrases like, control panel, "panel" or fire alarm panel or the like have been interchangeably used which means a control panel for controlling the installed devices.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
    integrating a digitized map on a user terminal, the digitized map comprising a representation of an area of a building, directions to a user of the user terminal for navigating the area, and positions for configuring one or more devices in the area;
    receiving, on the user terminal, position co-ordinates and configuration information of each of the one or more devices, wherein the position co-ordinates and the configuration information are received on the user terminal subsequent to the user having been directed to navigate the area and place the one or more devices in their respective positions according to the digitized map;
    requesting a configuration based on the configuration information for the one or more devices from a server;
    receiving the configuration for the one or more devices on the user terminal based on the request; and
    transmitting the configuration to each of the placed one or more devices thereby configuring the one or more devices.

2. The method of claim 1, wherein the configuration information is scanned from the one or more devices which include serial number, model number, device type for one or more devices.

3. The method of claim 1, wherein the integration of the digitized map, receiving of the position co-ordinates and the configuration information, requesting the configuration, and the receiving of the configuration for each device are associated with a user application on the user terminal.

4. The method of claim 1, wherein the user has been directed to navigate the one or more devices by using an indoor positioning system.

5. The method of claim 1, wherein the one or more devices comprise one or more of a detector, a module, an appliance, an annunciator, and a hooter.

6. The method of claim 1, wherein the one or more devices are wireless devices, wherein the position co-ordinates for each wireless device are determined by the user terminal using strength of wireless signals received from the wireless devices.

7. The method of claim 1, wherein the one or more devices are connected to a control panel, wherein the user terminal is configured to transmit the request to the server for transmitting the configuration of the one or more devices to the control panel.

8. The method of claim 7, wherein the control panel transmits the configuration for the one or more devices received from the server to the one or more devices.

9. The method of claim 1, wherein the user terminal is configured to detect a wrongly configured device and update correct configuration for the wrongly configured device.

10. The method of claim 1, wherein the configuration of each of the one or more devices can be modified by the user of the user terminal.

11. A user terminal comprising:
    an integration module adapted to integrate a digitized map on the user terminal, the digitized map comprising a representation of an area of a building, directions to a user of the user terminal for navigating the area, and positions for configuring one or more devices in the area;
    an indoor positioning system adapted to navigate the one or more devices by using the positions of the one or more devices on the digitized map;
    a receiver adapted to receive position co-ordinates and configuration information of each of the one or more devices, wherein the position co-ordinates and the configuration information are received on the user terminal subsequent to the user having been directed to navigate the area and place the one or more devices in their respective positions based on the digitized map, the receiver further adapted to receive a configuration for the one or more devices from a server based on a request; and
    transmitter adapted to transmit the configuration to each of the placed one or more devices based on the configuration information thereby configuring the one or more devices.

12. The user terminal of claim 11, wherein the configuration information is scanned from the one or more devices which include serial number, model number, device type for one or more devices.

13. The user terminal of claim 11, wherein the request comprises at least the configuration information of the one or more devices.

14. The user terminal of claim 11, wherein the integration of the digitized map, receiving of the position co-ordinates and the configuration information, requesting the configuration, and the receiving of the configuration for each device are associated with a user application on the user terminal.

15. The user terminal claim 11, wherein the one or more devices comprise one or more of a detector, a module, an appliance, an annunciator, and a hooter.

16. The user terminal of claim 11, wherein the one or more devices are wireless devices, wherein the position co-ordinates for each of the wireless device are determined by the user terminal using strength of wireless signals received from the wireless devices.

17. The user terminal of claim 11, wherein the transmitter is further adapted to transmit the request for sending the configuration of the one or more devices to a control panel.

18. The user terminal of claim 17, wherein the control panel transmits the configuration for the one or more devices received from the server to the one or more devices.

19. The user terminal of claim 11, wherein the configuration of each of the one or more devices can be modified by the user of the user terminal.

20. A computer storage media comprising one or more processors and a memory coupled to the one or more processors, the memory storing instructions which are executed by the one or more processors, the one or more processors operable to:
- integrate a digitized map on a user terminal, the digitized map comprising a representation of an area of a building, directions to a user of the user terminal for navigating the area, and positions for installing one or more devices in the area; the digitized map;
- receive, on the user terminal, position co-ordinates and configuration information for each of the one or more devices, wherein the position co-ordinates and the configuration information are received on the user terminal subsequent to the user having been directed to navigate the area and place the one or more devices in their respective positions based on the digitized map;
- request a configuration based on the configuration information for the one or more devices from a server;
- receive the configuration for the one or more devices based on the configuration information on the user terminal; and
- transmit the configuration to each of the placed one or more devices thereby installing the one or more devices.

* * * * *